No. 708,137. Patented Sept. 2, 1902.
L. P. GRAHAM.
CORN PLANTER.
(Application filed June 5, 1902.)
(No Model.) 2 Sheets—Sheet 1.

Witnesses. Inventor.
Nora Graham. Levi P. Graham
Ima Graham.

THE NORRIS PETERS CO., PHOTO-LITHO., WASHINGTON, D. C.

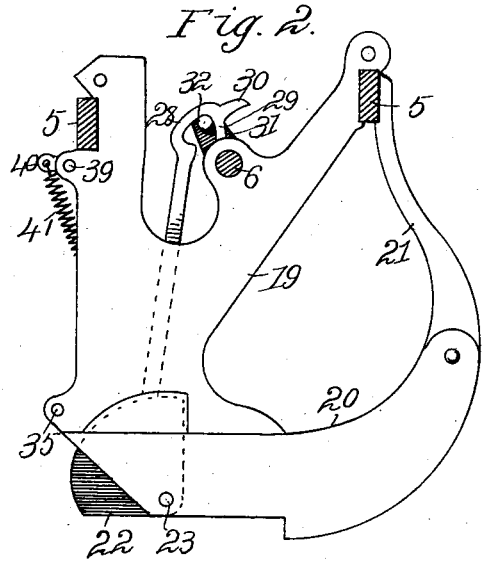
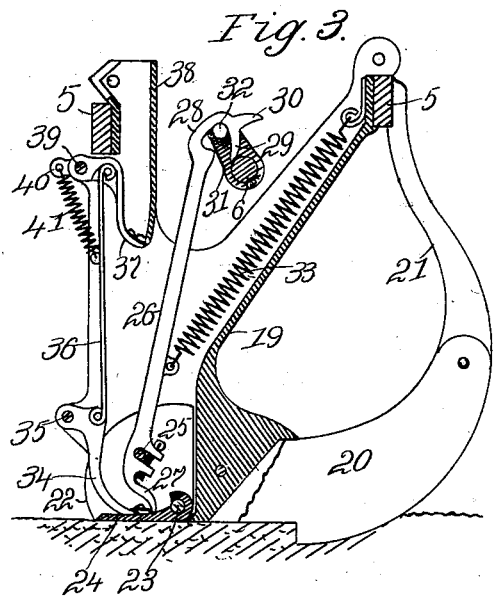
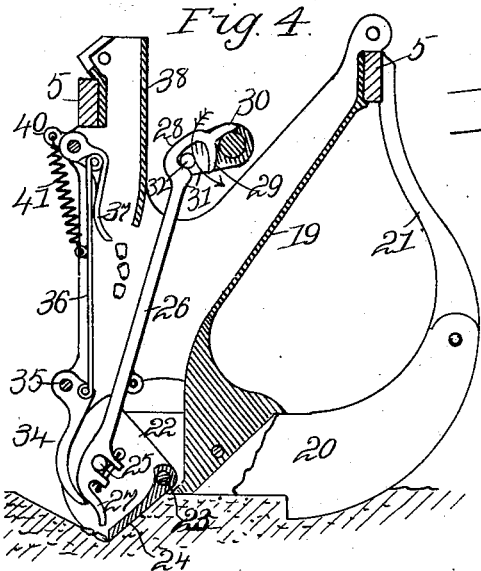
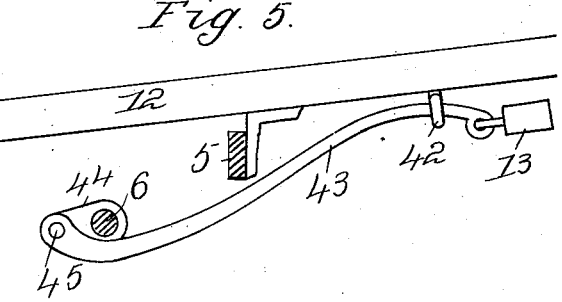
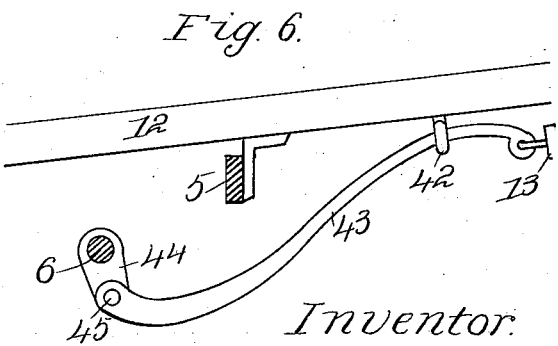

UNITED STATES PATENT OFFICE.

LEVI P. GRAHAM, OF DECATUR, ILLINOIS.

CORN-PLANTER.

SPECIFICATION forming part of Letters Patent No. 708,137, dated September 2, 1902.

Application filed June 5, 1902. Serial No. 110,384. (No model.)

*To all whom it may concern:*

Be it known that I, LEVI P. GRAHAM, of the city of Decatur, county of Macon, and State of Illinois, have invented certain new and useful Improvements in Corn-Planters, of which the following is a specification.

This invention provides means for forming short furrows intermittently and depositing the seed therein. It is distinguishable from planters that cut continuous furrows to full depth between the hills of corn, and it is in some respects an improvement on the planter patented to me August 13, 1901, No. 680,326. The invention is exemplified in the structure hereinafter described, and it is defined in the appended claims.

Figure 1:
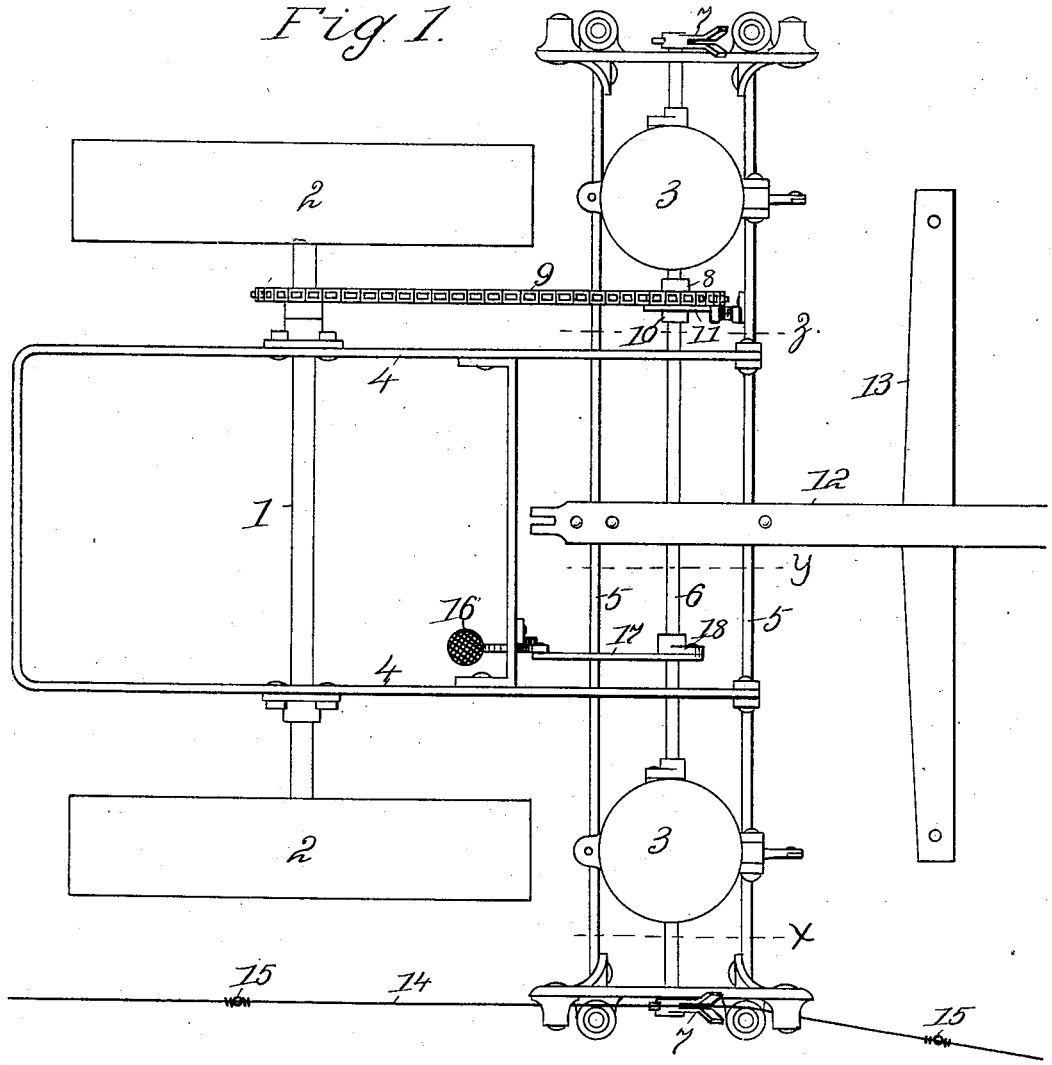
Figure 7:
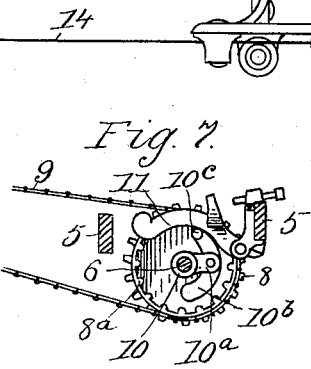

In the drawings forming part of this specification, Figure 1 is a plan of so much of a planter as is needed to explain my invention. Fig. 2 is a side elevation of a planter-shank on section-line X in Fig. 1. Figs. 3 and 4 are vertical sections through the planter-shank from front to back, one figure showing the intermittently-acting furrow-former raised and the other showing it lowered to make a depression and deposit the seed therein. Figs. 5 and 6 are side elevations of the tongue and an appliance for transmitting potential energy to the intermittently-acting furrow-formers, the views being taken on section-line Y in Fig. 1. In Fig. 5 are shown the conditions that exist when the furrow-formers are raised, and the conditions that exist when the furrow-formers are lowered are shown in Fig. 6. Fig. 7 is a detail of the mechanism preferably used to store potential energy while traveling from one hill to another for the purpose of actuating the seed-depositing mechanism when a hill is reached. This figure is taken from section-line Z in Fig. 1.

Apart from the restrictions imposed by the claims the planter may be made in any desirable manner consistent with the purpose of the invention. The invention relates to means for depositing the seed into the soil, and descriptions of parts not contributive to that operation are merely suggestive or advisory.

An axle-shaft for the covering-wheels 2 is shown at 1. The seedboxes are shown at 3. The wheel-frame 4 is mounted on the axle of the covering-wheels, and it connects pivotally at its front end with a front or runner frame composed of cross-bars 5. A rock-shaft 6 is journaled in the front frame crosswise thereof, and it is an essential element in the embodiment of the invention. Forked levers 7 connect with the ends of the rock-shaft and provide for transmitting motion derived from the knots 15 on a check-row wire 14 to the rock-shaft 6. A foot-lever 16 may also be connected with the rock-shaft by means of a link 17 and an arm 18 or otherwise, and it also provides means for giving initial back motion to the shaft. A chain 9 takes motion from one of the covering-wheels or, which is the same thing, from the axle of the covering-wheels and imparts it to a wheel 8, running loose on the rock-shaft 6. The wheel 8 is recessed in one of its faces and provided with internal ratchet-teeth. An arm $10^a$ has its hub 10 fastened to the shaft. A catch $10^b$ is pivotally attached to the swinging end of arm $10^a$. One end of the catch is adapted to engage the ratchet-teeth $8^a$ of wheel 8, and a pin $10^c$ projects sidewise from the wheel-engaging end of the catch. A throw-out lever 11 forces the catch $10^b$ from contact with wheel 8 as the rock-shaft reaches the termination of its forward rock, and it holds the catch out of engagement with the ratchet-teeth until the shaft is rocked backward and the corn deposited. As the shaft 6 is rocked backward in depositing the seed the wheel-engaging end of catch $10^b$ rides from under the throw-out lever 11 and swings into contact with a tooth $8^a$ of the wheel 8. The friction of the catch against the tooth is sufficiently strong to enable the pin $10^c$ to raise the throw-out lever to an extent sufficient to carry the shaft 6 to the termination of its forward rock; but when that is accomplished the throw-out is held against further motion out of the path of the pin of the catch, and the resistance of the throw-out forces the catch out of contact with the tooth. As soon as the catch is forced out of contact with the tooth the weight of the throw-out bears on the pin of the catch to prevent the catch from reëngaging the wheel, and this continues until the shaft is rocked to the end of its backward movement. An arm 44 is fixed onto the rock-shaft under tongue 12 as a matter of preference, a link 43 connects with a pivot-pin 45 on the swinging end of arm 44 and extends forward beneath the tongue, an eyebolt 42 provides a support for the forward part of the link 43, and a doubletree 13 or other team hitch connects with the front end of the link. The pull of the team is exerted lengthwise of arm 44 when the shaft 6 is rocked forward, and a dead-center lock is formed which holds the shaft in its forward position. When a lever 7 encounters a check-row-wire knot 15 or when the foot-lever 16 is slightly depressed, the shaft 6 is rocked backward to an extent sufficient to break the dead-center lock, and as soon as that is done the pull of the team is transferred from forward pull on the entire planter into rocking action on the shaft 6 and the shaft is rocked forcibly backward to cut a short furrow or make a depression for the reception of the seed. As soon as the seed is deposited the chain 9 begins taking force from the rear wheels and storing it up for a subsequent seed-depositing operation, and before the next hill is reached the motion of the planter has been sufficiently accelerated to bring the doubletree back to the relative position shown in Fig. 5.

The foregoing describes what I consider a desirable way of rocking the shaft 6 forward while traveling between cross-rows and forcing it backward when a cross-row is reached; but it is a matter of indifference so far as the present invention is concerned in what manner the shaft is rocked.

The shanks 19 for the seedboxes 3 are preferably provided with furrow-forming runners 20 for reasons that will be hereinafter explained, and in the rear parts of the shanks or of the runners are pivoted soil-penetrating seed-buckets 22. In this instance the seed-buckets are pivoted at 23 in the runners 20, with their bottoms 24 normally in line with the lower lines of the forked parts of the runners. Each bucket consists of a pair of side walls, a bottom, and a cross-pin 25, by means of which they are rocked on their pivots in entering the soil and rising out thereof. The pivots 23 are at the rear front corners of the buckets, the bottom 24 normally extends rearward from the pivots in approximately horizontal lines, and the cross-pins 25 are above the bottoms 24. An arm or lever 31 is attached to shaft 6 adjacent to each of the planter-shanks, and a push-bar 26 connects a pin 32 on the arm of the rock-shaft with the cross-pin 25 of a bucket. An extension 27 of push-bar 26 projects below the cross-pin 25 and curves forward into contact with the bottom of the bucket near the pivot thereof when the bucket is in a raised position. A valve 34 pivots in the rear part of the shank at 35, and it extends downward into contact with the bottom of the bucket when the bucket is raised far enough in front of the extension 27 of push-bar 26 to leave a passage for corn. The valve 34 is held in the position shown in Fig. 3 by means of a spring that resists backward motion in the valve. A seed-chute 38 is formed in the upper end of the shank to take the seed from the seedbox and carry it to the lower part of the shank, and such chute is normally closed at its lower end by means of a valve 37. The valve 37 is pivoted at 39, and a link 36 connects valve 34 with valve 37 through pivotal connections made in front of the pivots of the valves. Valve 37 has an arm 40 extending rearward from pivot 39, and a spring 41 connects the arm with link 36 and tends to hold both valves closed. The extension 27 of push-bar 26 and the lower end of valve 34 are both inclined forward, and when corn travels down the passage-way between them it rests on the bottom of the bucket in front of or under the cross-pin 25, as shown in Fig. 3. When a cross-row is reached and the shaft 6 is rocked backward, the bucket is rocked to the position shown in Fig. 4, and the corn is forced off the bottom of the bucket and into the depression made by the bucket by means of the extension 27. The action of the bucket is rapid and the corn is forced downward by the overhanging extension at the same speed the bucket travels and is carried clear of the bucket before the bucket begins its backward movement. The rounded rear end of the push-bar 26 strikes the lower end of valve 34 as the bucket is forced into the soil, and as valve 34 is forced backward it imparts motion to valve 37 through link 36 and releases the corn held in chute 38, as shown in Fig. 4. The valve 34 keeps in contact with the push-bar until the bottom of the bucket has nearly resumed a horizontal position, and as the extension 27 separates from the valve a passage-way is formed that directs the corn to its proper position on the bottom of the bucket. The runner and shank are cut away to leave the rear lower corner of the bucket exposed as a matter of preference, and in consequence of this arrangement the part of the bucket that enters the soil is left uncovered to be cleaned by the scouring action of the soil, clods, and trash, and there is no possibility of soil or the like being drawn up into the shank or the runner. The runner 20 may be much smaller than those ordinarily used, and it has a double purpose. When the planter is depositing the seed at an ordinary depth, the runner may run on top of the ground and do nothing further than displace clods and cut its way through trash above the general surface of the ground; but when it is desired to plant to an unusual depth the runner may be set into the ground to increase the depth of deposit of the bucket. The rock-shaft moves backward rapidly in depositing the seed, and it preferably rocks forward with comparative slowness, so that the work of storing energy to actuate the seed-buckets may be distributed throughout the travel of the planter between cross-rows as nearly as possible. The buckets impede travel of the planter while they are in the soil, and to make the planter run as light as possible the buckets are permitted to swing clear of the soil as soon as the seed is deposited. To relieve the buckets as soon as they have reached their greatest depth in the soil, the head 28 of push-bar 26 is slotted in its front edge to receive the pin 32 of the rock-arm 31 and an extension 30 of the head is in position to strike the shaft just as the bucket is completing a planting operation and force the pin to ride clear of the slot. In Fig. 4 the bucket is shown at nearly its lowest position, and completion of the backward rock of the arm 31 will force the pin 32 out of the slot of the head and permit the bucket to rise independent of the rock-shaft. The resistance of the soil forces the bucket upward as soon as the push-bar is disengaged from the pin 32; but to provide against possible emergencies and to hold the bucket raised under all circumstances a spring 33 in Fig. 3 may connect with the push-bar and exert upward stress thereon. The spring is strong enough to overcome the weight of the bucket and the push-bar, and it is used merely as a safeguard against possible irregularities in the raising action of the soil on the bucket. When the push-bar is raised in advance of the rock-arm 31, it stands in position to engage the pin 32 when the rock-shaft is carried forward and the hooked extension 29 facilitates and assures reëngagement of the pin with the push-bar. The slot in which the pin 32 acts is elongated to such an extent that the dead-center lock formed by link 43 and arm 44 is entirely broken and potential energy stored by the travel of the planter between cross-rows is exerted on the rock-shaft before the rock-shaft begins to force the buckets into the soil.

The clutch mechanism shown in Fig. 7 is explained with more particularity in application, Serial No. 78,383, filed by me October 11, 1901, and is claimed in such application.

It is obvious that the bucket is useful to retain and discharge the seed apart from the soil-penetrating peculiarity and claims 3 and 4 are intended to cover the specific form of second drop regardless of its capabilities for forming seed-receiving depressions.

I claim—

1. In a planter, the combination of a seed-conveying shank adapted to travel along the surface of the soil, a seed-retaining bucket hinged in the lower end of the shank with its bottom extended horizontally rearward from the hinge, and means for forcing the rearward extension of the bucket into the soil below the shank and discharging the seed into the depression made by the bucket.

2. In a planter, the combination of a seed-conveying shank adapted to travel along the surface of the soil, a seed-retaining bucket composed of sides and a bottom, such bucket being hinged in the lower end of the shank with its bottom extended rearward from the hinge, and a push-bar to force the rearward extension of the bucket into the soil below the shank and discharge the seed into the depression formed by the bucket.

3. In a planter, the combination of a seed-conveying shank adapted to travel along the surface of the soil, a seed-retaining bucket composed of sides and a bottom, such bucket being hinged in the lower part of the shank with its bottom extending rearward from the hinge, a push-bar pivotally connected with the bucket at a point above and to the rear of the hinge, and an extension of the push-bar approximately reaching the bottom of the bucket and acting as a seed-discharger therefor.

4. In a planter, the combination of a seed-conveying shank adapted to travel along the surface of the soil, a seed-retaining bucket composed of sides and a bottom, such bucket being hinged in the lower part of the shank with its bottom extending rearward from the hinge, a push-bar pivotally connected with the bucket at a point above and to the rear of the hinge, an extension of the push-bar approximately reaching the bottom of the bucket and forming a seed-discharger therefor and a valve pivoted in the shank in the rear of the push-bar with its lower end in position to close the rear end of the bucket, when the bucket is raised.

5. In a planter, the combination of a seed-conveying shank adapted to travel along the surface of the soil, a seed-retaining bucket hinged in the lower end of the shank with its bottom extended rearward from the hinge and its rear lower part projecting beyond the walls of the shank, and means for forcing the rearward extension of the bucket into the soil below the shank.

6. In a planter, the combination of a seed-conveying shank, a seed-retaining bucket hinged in the lower end of the shank with its bottom extending rearward from the hinge, means for forcing the rearward extension of the bucket into the soil below the shank and a furrow-forming runner attached to the lower end of the shank with its lower edges above the soil-penetrating position of the rearward extension of the bucket.

7. In a planter, the combination of a seed-conveying shank, a seed-retaining bucket hinged in the lower end of the shank with its bottom extended rearward from the hinge, a push-bar connecting pivotally with the bucket and extending upward therefrom, and a rock-arm adapted to press downward on the push-bar to force the bucket into the soil and swing clear of the push-bar when the bucket is at the end of its downward movement.

In testimony whereof I sign my name in the presence of two subscribing witnesses.

LEVI P. GRAHAM.

Witnesses:
NORA GRAHAM,
INA C. GRAHAM.